Patented July 5, 1932

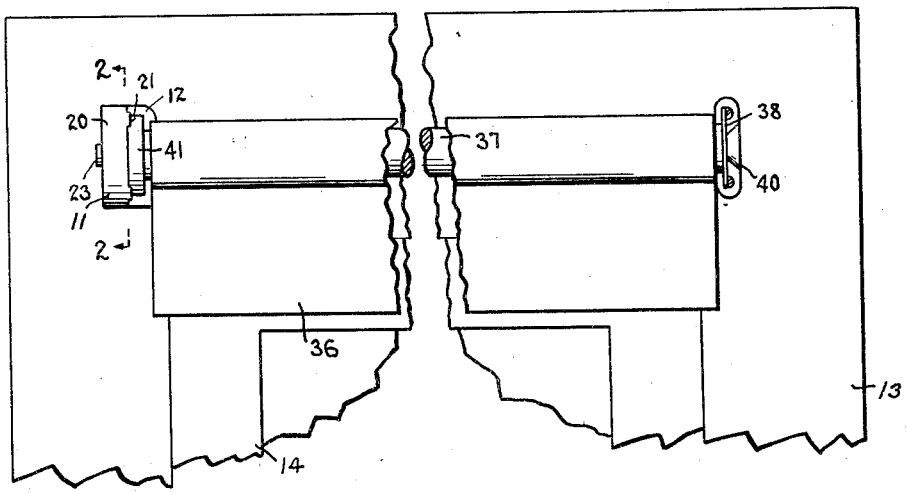

1,865,466

UNITED STATES PATENT OFFICE

FRANK J. GOSSLING, OF ST. BERNARD, AND BERNARD A. GOSSLING, OF NORWOOD, OHIO

WINDOW SHADE OPERATING DEVICE

Application filed June 26, 1930. Serial No. 464,039.

Our invention relates to a spring operated shade roller wherein the operating mechanism is contained in the bracket for supporting the roll.

The object of the invention is to provide a bracket adjacent to one end of the roll containing the operating mechanism and to provide the roll with end plates, one of which is made in the form of a guard to cover the operating pawl. Further objects reside in the novel construction of parts.

The invention will be further readily understood from the following description and claim and from the drawing in which latter:

Fig. 1 is a front view of a window with our improved shade mounted thereon and partly broken away.

Fig. 2 is a vertical section taken in the plane of the line 2—2 of Fig. 1 and partly broken away.

Fig. 3 is a horizontal section of the same taken in the plane of the irregular line 3—3 of Fig. 2 and partly broken away, and Fig. 4 is an axial section taken in the plane of the line 4—4 of Fig. 2.

Our improved device comprises a bracket 11 provided with feet 12 arranged to be secured to the frame 13 of a window 14 as by screws 15. The bracket is provided with a central aperture 16 through which a shaft 17 extends. The shaft is provided with an enlarged hub 18 and a rectangular extension 19. A casing 20 is secured to the bracket as by means of lugs 21 received in slots 22 in the bracket and bent over the bracket to hold the casing to the bracket. A pressed out portion 23 central of the casing forms a bearing 24 for one end of the shaft. A spiral spring 25 has its inner end received through a slot 26 in the shaft. The other end of the spring is clinched to the casing, being received through slots 27 and 28.

A collar 30 is pressed onto the rectangular extension of the shaft and is provided with a pair of notches 31. A pawl 32 is journaled on a stud 33 fixed to the bracket. The pawl has an engaging lug 34 arranged to co-act with either of the notches. A pin 35 extending from the bracket prevents the pawl from moving out of operating relation to the collar.

A shade 36 is suitably tacked to a rod 37. An end plate 38 forms a guiding flange for one end of the rod and has a projecting pin 39 arranged to be received in an open ended bearing in a bracket 40 secured to the window frame, for ready removal of the rod. An end plate 41 is secured to the other end of the rod as by screws 42 received through holes in the flange and threaded into the rod. The end plate has a rectangular opening 43 at its center arranged to be received over the extension 19 forming an operating connection between the parts. The rod 37 has an enlarged bore 44 for reception of the extension 19.

The end plate 41 has a radial flange 45 arranged to position the shade roller relative to the bracket and also to enclose the pawl operating means.

The shade is rolled around the rod and the opening in the plate 41 is passed over the extension 19, the pin at the other end of the rod is dropped into the bearing in the bracket 40. Drawing downwardly on the shade will cause the spring 25 to wind about the shaft 17, creating a tension on the spring. When movement of the shade is stopped, the pawl will drop into one of the notches for maintaining the shade in the desired position. A slight jerking action on the shade will release the pawl and the spring will cause the shade to roll upon the rod. The end plates will guide the shade and cause it to roll evenly upon the rod, preventing the edges of the shade from becoming frayed.

Having thus fully described our invention what we claim as new and desire to secure by Letters Patent is:

In a window shade operating device the combination of a roller, a housing associated with said roller, a shaft journaled in said housing, a spiral spring secured to said shaft and housing, said shaft provided with a squared extension, a collar provided with notches secured to said extension, a pawl pivoted to said housing and having operative connection with said collar, a plate secured to said roller, said plate provided with a radial flange forming a housing about said pawl and collar, and said squared extension received through said plate forming a driving connection between said shaft and roller.

In testimony whereof, we have hereunto signed our names.

FRANK J. GOSSLING.
BERNARD A. GOSSLING.